United States Patent
Shaul et al.

(10) Patent No.: US 12,554,508 B2
(45) Date of Patent: Feb. 17, 2026

(54) PROCESSING COMPLEX PACKED TENSORS USING INTEGRATED CIRCUIT OF REAL AND COMPLEX PACKED TENSORS IN COMPLEX DOMAIN

(71) Applicant: International Business Machines Corporation, Armonk, NY (US)

(72) Inventors: Hayim Shaul, Kfar Saba (IL); Nir Drucker, Zichron Yaakov (IL); Ehud Aharoni, Kfar Saba (IL); Omri Soceanu, Haifa (IL); Gilad Ezov, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 17/937,101

(22) Filed: Sep. 30, 2022

(65) Prior Publication Data
US 2024/0126557 A1    Apr. 18, 2024

(51) Int. Cl.
*G06F 9/38* (2018.01)
*G06F 9/30* (2018.01)
*H04L 9/00* (2022.01)

(52) U.S. Cl.
CPC ........ *G06F 9/3887* (2013.01); *G06F 9/30036* (2013.01); *H04L 9/008* (2013.01)

(58) Field of Classification Search
CPC .. G06F 9/3887; G06F 9/30036; G06F 9/3001; H04L 9/008
See application file for complete search history.

(56) References Cited

U.S. PATENT DOCUMENTS

| | | | |
|---|---|---|---|
| 2016/0164671 A1* | 6/2016 | Gentry | H04L 63/0442 380/28 |
| 2017/0134157 A1 | 5/2017 | Laine et al. | |
| 2019/0007196 A1 | 1/2019 | Malluhi et al. | |
| 2019/0250915 A1* | 8/2019 | Yadavalli | G06F 9/34 |
| 2019/0385063 A1* | 12/2019 | Yu | G06N 3/045 |
| 2020/0076570 A1 | 3/2020 | Musuvathi et al. | |
| 2020/0105046 A1* | 4/2020 | Wald | G06T 15/506 |
| 2021/0042127 A1* | 2/2021 | Koneru | G06F 9/3001 |
| 2021/0042624 A1* | 2/2021 | Matveev | G06F 9/5027 |
| 2021/0182021 A1* | 6/2021 | Wang | G06F 7/485 |
| 2021/0191765 A1* | 6/2021 | Bokam | G06F 30/20 |
| 2021/0357475 A1* | 11/2021 | Wang | G06F 7/4876 |
| 2022/0126210 A1* | 4/2022 | Kumar | G06F 21/52 |
| 2022/0138286 A1* | 5/2022 | Zage | H04L 63/0428 726/26 |

(Continued)

OTHER PUBLICATIONS

Chen et al., "Double Batch for RLWE-Based Leveled Fully Homomorphic Encryption", Jul. 2015, vol. 24, No. 3, pp. 661-666 (Year: 2015).*

(Continued)

*Primary Examiner* — Kenneth W Chang
(74) *Attorney, Agent, or Firm* — Edward J. Wixted, III

(57) ABSTRACT

An example system includes a processor that can receive a number of complex packed tensors, wherein each of the complex packed tensors include real numbers encoded as imaginary parts of complex numbers. The processor can execute a single instruction, multiple data (SIMD) operation on the complex packed tensors using an integrated circuit of real and complex packed tensors in a complex domain to generate a result.

20 Claims, 10 Drawing Sheets

(56) References Cited

U.S. PATENT DOCUMENTS

2022/0197601 A1\* 6/2022 Adelman ............ G06F 9/30014
2022/0413848 A1\* 12/2022 Pal ...................... G06F 9/30134

OTHER PUBLICATIONS

Aharoni et al., "Tile Tensors: A versatile data structure with descriptive shapes for homomorphic encryption", arXiv:2011.01805v1 [cs.CR], Nov. 3, 2020, 17 pages.

Duhyeong Kim et al., "Approximate Homomorphic Encryption over the Conjugate-invariant Ring", In: Lee K. (eds) Information Security and Cryptology—ICISC 2018. ICISC 2018. Lecture Notes in Computer Science, vol. 11396, 18 pages.

Fabian Boemer et al., "nGraph-HE2: A High-Throughput Framework for Neural Network Inference on Encrypted Data", In Proceedings of the 7th ACM Workshop on Encrypted Computing & Applied Homomorphic Cryptography (WAHC'19). Association for Computing Machinery, New York, NY, USA, 45-56, 29 pages, Nov. 2019.

\* cited by examiner

500

700

PROCESSING COMPLEX PACKED TENSORS USING INTEGRATED CIRCUIT OF REAL AND COMPLEX PACKED TENSORS IN COMPLEX DOMAIN

BACKGROUND

The present techniques relate to encoding ciphertexts. More specifically, the techniques relate to processing real numbers.

SUMMARY

According to an embodiment described herein, a system can include processor to receive a number of complex packed tensors, wherein each of the complex packed tensors includes real numbers encoded as imaginary parts of complex numbers. The processor can also further execute a single instruction, multiple data (SIMD) operation on the complex packed tensors using an integrated circuit of real and complex packed tensors in a complex domain to generate a result.

According to another embodiment described herein, a method can include receiving, via a processor, a number of complex packed tensors, wherein each of the complex packed tensors include real numbers encoded as imaginary parts of complex numbers. The method can further include executing, via the processor, a single instruction, multiple data (SIMD) operation on the complex packed tensors using an integrated circuit of real and complex packed tensors in a complex domain to generate a result.

According to another embodiment described herein, a computer program product for packing real numbers can include computer-readable storage medium having program code embodied therewith. The program code executable by a processor to cause the processor to receive a number of complex packed tensors, wherein each of the complex packed tensors include real numbers encoded as imaginary parts of complex numbers. The program code can also cause the processor to execute a single instruction, multiple data (SIMD) operation on the encrypted complex packed tensors using an integrated circuit of real and complex packed tensors in a complex domain to generate a result.

DETAILED DESCRIPTION

Using homomorphic encryption (HE), two ciphertexts can be multiplied and added without being decrypted first. In addition, using the simple primitives of additional and multiplication, any algorithm can then be approximated. While many algorithms operate with real numbers, the fully homomorphic Cheon-Kim-Kim-Song (CKKS) encryption (FHE) scheme, first released in 2016, also works over complex numbers. One solution for handling real numbers when using real numbers with the CKKS encryption scheme is to set the imaginary part to zero everywhere and thus ignore the imaginary parts. However, this solution may lead to a doubling of the computation time of algorithms, a doubling of communication volume, and a doubling of random-access memory (RAM) requirements. Some other solutions pack real values in the imaginary parts of complex numbers as well. However, these solutions pack real values into the imaginary parts at the cost of severely limiting the allowed set of operators. For example, none of these solutions may allow for a general pair-wise product or dot product.

According to embodiments of the present disclosure, a system can include a processor to receive a number of complex packed tensors. Each of the complex packed tensors includes real numbers encoded as imaginary parts of complex numbers. The processor can execute a single instruction, multiple data (SIMD) operation on the complex packed tensors using an integrated circuit of real and complex packed tensors in a complex domain to generate a result. Thus, embodiments of the present disclosure enable improved central processing unit (CPU) or graphics processing unit (GPU) usage, communication, and RAM usage by using the imaginary parts of complex numbers. In particular, a 68% performance boost with respect to speed improvement for computing neural network inference over encrypted data was detected from use of the techniques described herein was noted when applied to the AlexNet deep convolutional neural network (CNN) architecture, first released in 2012. In addition, a 1.96× speedup was noted in with respect to computing logistic regression. Moreover, the embodiments may be used in various applications, such as logistic regression, linear regression, and to implement convolution layers, fully-connected layers, and activation layers, among other layers of neural networks.

Figure 1:
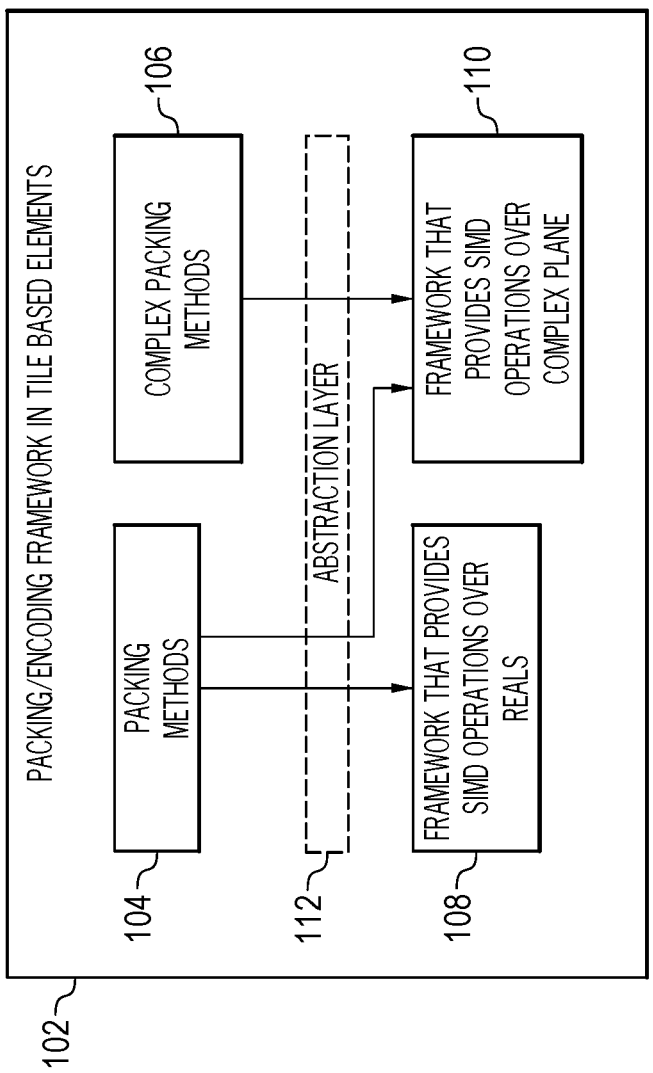
FIG. 1 is a block diagram of an example system for packing real numbers of ciphertexts using imaginary parts of complex numbers.

With reference now to FIG. 1, a block diagram shows an example system for packing real numbers of ciphertexts using imaginary parts of complex numbers. The example system 100 of FIG. 1 includes a framework 102 for packing and encoding tiled based elements. For example, the framework 102 may be a homomorphic encryption (HE) framework that processes homomorphically encrypted ciphertexts. In some examples, the framework 102 may be any suitable platform that supports SIMD operations, such as those SIMD operations found in hardware processing units, such as CPUs or GPUs. For example, the framework 102 can process CPU or GPU SIMD based registers. The framework 102 includes a packing method 104. For example, the packing method 104 may be any suitable general packing method. As one example, the packing method 104 may be a tile tensor packing method. As used herein, a tile tensor is a data structure that packs tensors in fixed size chunks, referred to herein as tiles. For example, the tensors to be packed may be vectors or matrices of real numbers. In the context of an HE framework, tiles may be the plaintexts behind HE ciphertexts. The framework 102 includes complex packing methods 106. For example, the complex packing method 106 may be a homomorphic complex packing method. As one example, the homomorphic complex packing method may support complex packed tile tensors, as described herein. The system 100 also include a framework 108 that provides SIMD operations over real numbers. For example, the framework 108 may be the Real HE for Arithmetic of Approximate Numbers (HEAAN) framework, first released May 2016. The system 100 includes a framework 110 that provides SIMD operations over the complex plane. The system 100 also further includes an abstraction layer 112. For example, the abstraction layer 112 may be a layer that hides homomorphic encryption scheme details from the packing method 104 and complex packing method 106. For example, the abstraction layer 112 may provide application programming interfaces (APIs) to the packing methods 104 and 106. These APIs are translated by the abstraction layer 112 to HE scheme operations. In various examples, the APIs can be unified per the different schemes and thus hide the scheme implementation from the user. In some examples, the abstraction layer 112 can be smart. For example, the abstraction layer 112 can automatically identify which underlying scheme is best to use, or that the processing may involve manual knobs that the packing layers (the API caller) can use. In various examples, when several schemes or platforms are supported by framework 102, the abstraction layer 112 may allow switching between the schemes or platforms in an easy way without using different APIs.

In the example of FIG. 1, the system 100 may reduce the size of real valued tensors by converting them to complex valued tensors. In particular, the system 100 may use a function CT=cpack(T,i) which takes a real-valued tensor $T[n_1, n_2, \ldots, n_k]$, and converts the real-valued tensor to a complex tensor with the i'th dimension reduced by half $CT_1[n_1, n_2, \ldots, n_{i/2}, \ldots, n_k]$. For example, element $(j_1, j_2, \ldots, j_k)$ of this tensor is a complex number whose real part is $T(j1, \ldots, ji*2, \ldots, j_k)$ and imaginary part is $T(j_1, \ldots, ji*2+1, \ldots, j_k)$. In various examples, a function cunpack(CT,i) may be used to separate the real and imaginary parts, returning the original tensor T.

Still referring to FIG. 1, in various examples, complex packed tensors can be manipulated in a way that is homomorphic to the original tensors. Generally, given two regular tensors $T_1$ and $T_2$ with shapes $[n_1, n_2, \ldots, n_k]$, and $[m_1, m_2, \ldots, m_k]$, then tensors $T_1$ and $T_2$ have compatible shapes if they have the same dimension, and for each j, at least one of these conditions holds: (1) $nj=m_j$, or (2) $n_j=1$, (3) or $m_j=1$. A tensor with shape $[n_1, \ldots, n_{j-1}, 1, \ldots, n_k]$ can be broadcasted along dimension j by duplicating the data in all dimensions that are not j along dimension j. Tensors with compatible shapes can be broadcasted to have the same shape, then manipulated using elementwise operators. Using broadcasting, elementwise operators, and summation, a wide variety of operators can be implemented. For example, these operators may include matrix multiplication and convolution.

The complex packed (cpacked) tensors generated using the techniques described herein can be similarly manipulated. For example, two real-value tensors $T_1$ and $T_2$ may have compatible shapes $[n_1, n_2, \ldots, n_k]$, and $[m_1, m_2, \ldots, m_k]$. The following mathematical properties may hold. For example, if $m_j=1$, then:

$$cpack(T_1, j) + T_2 = cpack(T_1 + T_2, j) \qquad \text{Eq. 1}$$

and $$cpack(T_1, j) * T_2 = cpack(T_1 * T_1, j) \qquad \text{Eq. 2}$$

If $m_j = n_j$, then:

$$cpack(T_1, j) + cpack(T_2, j) = cpack(T_1 + T_2, j) \qquad \text{Eq. 3}$$

If $j \diamond k$, then:

$$sum(cpack(T_1, j), k) = cpack(sum(T_1, j), k) \qquad \text{Eq. 4}$$

If $j \diamond k$, then:

$$rotate(cpack(T_1, j), k, x) = cpack(rotate(T_1, k, x), j) \qquad \text{Eq. 5}$$

where rotate($T_1$,k,x) means rotating $T_1$ along dimension k with an offset of x. If j==k, then:

$$rotate(cpack(T_1, j), k, x) = cpack(rotate(T_1, k, 2x), j) \qquad \text{Eq. 6}$$

Using Eqs. 1-6, the system 100 can thus apply the following various operators without any additional pre-processing or post-processing. For example, if CT is a complex packed tensor along dimension j, then the system 100 can add or multiply with any non-cpacked compatible tensor having dimension size $m_j=1$ along this dimension. The result is complex packed. In some examples, if $CT_1$ and $CT_2$ are complex packed tensors along dimension i, then the system 100 can add the complex packed tensors together if the complex packed tensors have compatible shapes. The resulting sum is complex packed. In some examples, if $CT_1$ is a complex packed tensor along dimension j, then the system 100 can sum over dimension k for any $j \diamond k$. The resulting sum is complex packed. In some examples, if $CT_1$ is a complex packed tensor along dimension j, then the system 100 can rotate over dimension k for any $j \diamond k$. The result is complex packed. In various examples, if $CT_1$ is a complex packed tensor along dimension j, then the system 100 can rotate by an even number over dimension j. The result is complex packed.

Similarly, in various examples, the system 100 can also perform the following two operators with some additional pre-processing and post-processing. In some examples, a multiplication and summation operation mul–sum( ) may be performed using the equation:

$$mul\text{-}sum(CT_1, CT_2, j) = sum(T_1 * T_2, j) \qquad \text{Eq. 7}$$

For example, if $CT_1 = cpack(T_1, j)$ and $CT_2 = cpack(T_2, j)$ have compatible shapes, then the system 100 can perform the following:

$$R_1 = CT_1 * conj(CT_2) \qquad \text{Eq. 8}$$

$$R_2 = (R_1 + conj(R_1))/2 \qquad \text{Eq. 9}$$

$$R_3 = sum(R_2, j) \qquad \text{Eq. 10}$$

where the result R3 is no longer complex packed and:

$$R_3 = sum(T_1 * T_2, j) \qquad \text{Eq. 11}$$

In some examples, the system 100 can similarly calculate a packing summation operation using the equation:

$$\text{pack-sum}(CT_1, j) = \text{sum}(T_1, j) \qquad \text{Eq. 12}$$

For example, if $CT_1 = \text{cpack}(T_1, j)$ then the system 100 can compute:

$$R_1 = \text{sum}(CT_1, j) \qquad \text{Eq. 13}$$

$$R_2 = R_1 - i^* R_1 \qquad \text{Eq. 14}$$

$$R_3 = (R_2 + \text{conj}(R_2))/2 \qquad \text{Eq. 15}$$

where the result is no longer complex packed, and:

$$R_3 = \text{sum}(T_1, j) \qquad \text{Eq. 15}$$

In some examples, the system 100 can further also calculate a rotation operation:

$$\text{Rotate-one}(CT_1, j) = \text{cpack}(\text{Rotate}(T_1, j, 1), j) \text{ where } CT_1 = \text{cpack}(T_1, j) \qquad \text{Eq. 16}$$

For example, the system 100 can calculate the rotate-one operation described in Eq. 16 using the equations:

$$R_1 = CT_1 * i \qquad \text{Eq. 17}$$

$$R_2 = (R_1 + \text{conj}(R_1))/2 \qquad \text{Eq. 18}$$

$$R_3 = (R_1 - \text{conj}(R_1))/2 \qquad \text{Eq. 19}$$

$$R_4 = R_2 + \text{Rotate}(R_3, j, 2) \qquad \text{Eq. 20}$$

where the result of $R_4$ is packed and:

$$R_4 = \text{cpack}(\text{Rotate}(T_1, j, 1), j) \qquad \text{Eq. 21}$$

In some examples, the system 100 may also be able to perform two operators that help cpack and cunpack intermediate results. For example, the system 100 can perform an interleaved complex packing operation int-cpack($T_1$, $T_2$). In particular, if $T_1$ and $T_2$ are real valued tensors, then the system 100 can compute:

$$R_1 = T_1 + i T_2 \qquad \text{Eq. 22}$$

where $R_1 = \text{cpack}(T_3, j)$, and where $T_3$ is the result of concatenating $T_1$ and $T_2$ along dimension j, and permuting the elements along this dimension in an interleaved manner. As another example, the system 100 can perform the operation int-cunpack($CT_1$). For example, if $CT_1 = \text{cpack}(T_1, j)$, then the system 100 can compute:

$$R_1 = (CT_1 + \text{conj}(CT_1))/2 \qquad \text{Eq. 23}$$

$$R_2 = i^*(CT_1 - \text{conj}(CT_1))/2 \qquad \text{Eq. 24}$$

where $R_1$ and $R_2$ are two slices of real valued tensor $T_1$, combined covering all of $T_1$, and executing int-cpack($R_1$, $R_2$) returns $CT_1$ back.

Thus, given two tensors $T[n_1, \ldots, n_k]$, $T'[m_1, \ldots, m_k]$ with compatible shapes, where either $n_l = m_l$, $n_l = 1$, or $m_l = 1$ for $l \neq k$, and positive integers i, j, x be, where $i \neq j$, it follows that:

$$\text{sum}_i(\text{cpack}_j(T)) = \text{cpack}_j(\text{sum}_i(T)) \qquad \text{Eq. 25}$$

$$\text{rot}_x(\text{cpack}_j(T), i) = \text{cpack}_j(\text{rot}_x(T, i)) \qquad \text{Eq. 26}$$

$$\text{rot}_x(\text{cpack}_j(T), j) = \text{cpack}_j(\text{rot}_{2x}(T, j)) \qquad \text{Eq. 27}$$

In particular, when $m_j = 1$, then:

$$\text{cpack}_j(T) * T' = \text{cpack}_j(T * T') \qquad \text{Eq. 28}$$

$$\text{cpack}_j(T) + T' = \text{cpack}_j(T + T') \qquad \text{Eq. 29}$$

and when $m_j = n_j$, then:

$$\text{cpack}_j(T) + \text{cpack}_j(T') = \text{cpack}_j(T + T') \qquad \text{Eq. 30}$$

where rotation of every tile in a tile tensor T along dimension k with an offset of x is denoted by $\text{rot}_x(T, k)$. The cpack( ) operator is homomorphic over addition, multiplication, summation, and rotation under the criteria described in Eqs. 25-30. In particular, as a result of Eqs. 25-30, for the complex packed tile tensors $CT = \text{cpack}_j(T)$, $CT' = \text{cpack}_j(T')$, and where $l \neq j$, the following tile tensors A, B, C, D may also be complex packed along the j-th dimension: $A = CT + CT'$, $B = \text{sum}_l(CT)$, $C = \text{rot}_x(CT, l)$, and $D = \text{rot}_{2x}(T, j)$. This property enables the application of the various operations described above to tile tensors without the need for additional pre-processing or post-processing steps. In particular, example operations include mul-Sum$_j$(CT,CT'), pack-Sum$_j$(CT) and rotate-One$_j$(CT), which operate on complex packed tile tensors. The results of these operations are equivalent to sum$_j$(T*T'), sum$_j$(T), and rot$_1$(T, j), respectively, which operate on real valued tensors. In addition to the equations 7-11, 12-15, and 16-21 above, these operators may be also defined via the equations:

$$\text{mul-sum}_j(CT, CT') = \text{sum}_j(\text{Re}(CT * CT')) \qquad \text{Eq. 31}$$

$$\text{pack-sum}_j(CT_1) = \text{Re}((1-i)^* \text{sum}_j(CT)) \qquad \text{Eq. 32}$$

$$\text{rotate-one}_j(CT) = \text{Re}(i * CT) + \text{Rot}_2(\text{Im}(i * CT), j) \qquad \text{Eq. 33}$$

where Re( ) and Im( ) denote operators that return the real and imaginary parts of a tile's elements in a tile tensor.

In various examples, the system 100 may use any of the above operations as part of applications in artificial intelligence (AI) among other algebraic computations. In some examples, the system 100 can implement algebraic computations of type needed for AI using cpacked tensors. For example, these computations may be useful in an environment that natively supports complex numbers, but where the computations to be performed are over real numbers. As one example, the system 100 can execute a tensor contraction of the type sum($T_1 * T_2$, j), where $T_1$ and $T_2$ are two compatible tensors. This tensor contraction may cover a wide range of algebraic operators. For example, the system 100 can thereby perform matrix-vector multiplication, matrix-matrix multiplication, and inner product between vectors. In various examples, if $T_1$ and $T_2$ are cpacked along the j'th dimension to $CT_1$ and $CT_2$, then this may be achieved via the operator mul-sum($CT_1$, $CT_2$, j), which produces a non-complex packed result. The non-complex packed result may then be input into an activation function. For example, the system 100 can thereby perform vector dot-product computations of linear regression or logistic regression, followed by an activation function. In this manner, the system 100 can provide more efficient support for linear and logistic regression models.

In some examples, for a neural network with a sequence of fully connected layers and activation functions, the system 100 can use the operator int-cpack after each activation function to return the packing to a complex packed form. Since the operator int-cpack interleaves the data, the system 100 may permute the next layer accordingly. A convolution layer is also supported since there exists efficient convolution implementations that include only tensor multiplication and rotations. In various examples, many AI computations may be performed in batch over a set of samples. The input and all intermediate results may have a batch dimension of j. The model weight tensors all have size 1 in dimension j, for compatibility. This dimension may be never summed.

Thus, if the system 100 executes complex packing on the input's dimension j, the system 100 can seamlessly multiply and add input and intermediate results with the model tensors. In various examples, this implementation may support all types of neural networks, including convolutional neural networks.

In some examples, for activation functions that may need to multiply two complex packed intermediate results, the system 100 can use int-cunpack before the activation function, and int-cpack after the activation function. Since the functions int-cunpack and int-cpack are elementwise, the interleaving may make no difference. For example, no extra permutation on the data may be required.

In addition, the system 100 may implement any of the above operations as part of applications in artificial intelligence (AI) among other algebraic computations under encryption. In particular, the CKKS scheme natively handles complex numbers, hence the above described methods are applicable and useful for use with CKKS. In CKKS and other HE schemes, the ciphertexts are flat vectors with some fixed size, depending on a specific configuration. For example, one size used may be 8192. These schemes may support elementwise add, multiply, and rotate. Some methods exist for performing tensor manipulation over this API. In various examples, some methods may support only a subset of the operators. For example, the methods may only support matrix-vector multiplication, and some are more general. The methods described herein can therefore be combined with any method to perform tensor manipulation over HE.

A simple example of the use of the techniques described herein under encryption is matrix-vector multiplication. For example, each matrix row can be stored complex packed in a ciphertext, and the vector stored complex packed in a ciphertext too. The complex packing allows the system 100 to fit twice amount of data in a single ciphertext. The system 100 can then perform a matrix-vector multiplication using sum–mul between the vector's ciphertext and each row.

A more general example of the use of the techniques described herein under encryption is using tile tensors. For example, the system 100 can add which dimension was c-packed to the tile tensor shape information, and the additional operators described herein to the set of operators that the tile tensor supports. This will allow implementing all the above-mentioned computations, while using the meta data to validate correctness.

Another particular example is performing an int-cpack operation. For example, the system 100 can perform an int-cpack operation when the data takes more than one ciphertext. If the data already fits within a ciphertext, shrinking the data further may not reduce computation time. For example, when performing an HE operation on a ciphertext with 8192 slots, it does not matter if the system 100 encrypts a vector of 1000, 2000, 4000, or 8192 elements. In this example, the system 100 may still perform the exact same operation on that ciphertext. If the data uses up an even number of ciphertexts, then the system 100 can int-cpack pairs of ciphertexts. For an odd number of ciphertexts, the system 100 can leave the last ciphertext non-cpacked. For example, leaving the last ciphertext non-cpacked is equivalent to cpacking the ciphertext with zeroes.

Another example of the use of the techniques described herein is in the context of the HE technique for matrix-vector multiplication of diagonalization. For example, each diagonal of a matrix may be kept as a separate ciphertext $C_i$, and the input vector in a ciphertext V. The system 100 can use the operation $sum(C_j * rot(V, j))$ to compute a result. In various examples, this sum operation can be implemented on a cpacked V, with a non-cpacked matrix, using the rotate-one operator described with respect to Eqs. 16-20.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional frameworks, packing methods, or additional layers, etc.).

Figure 2:
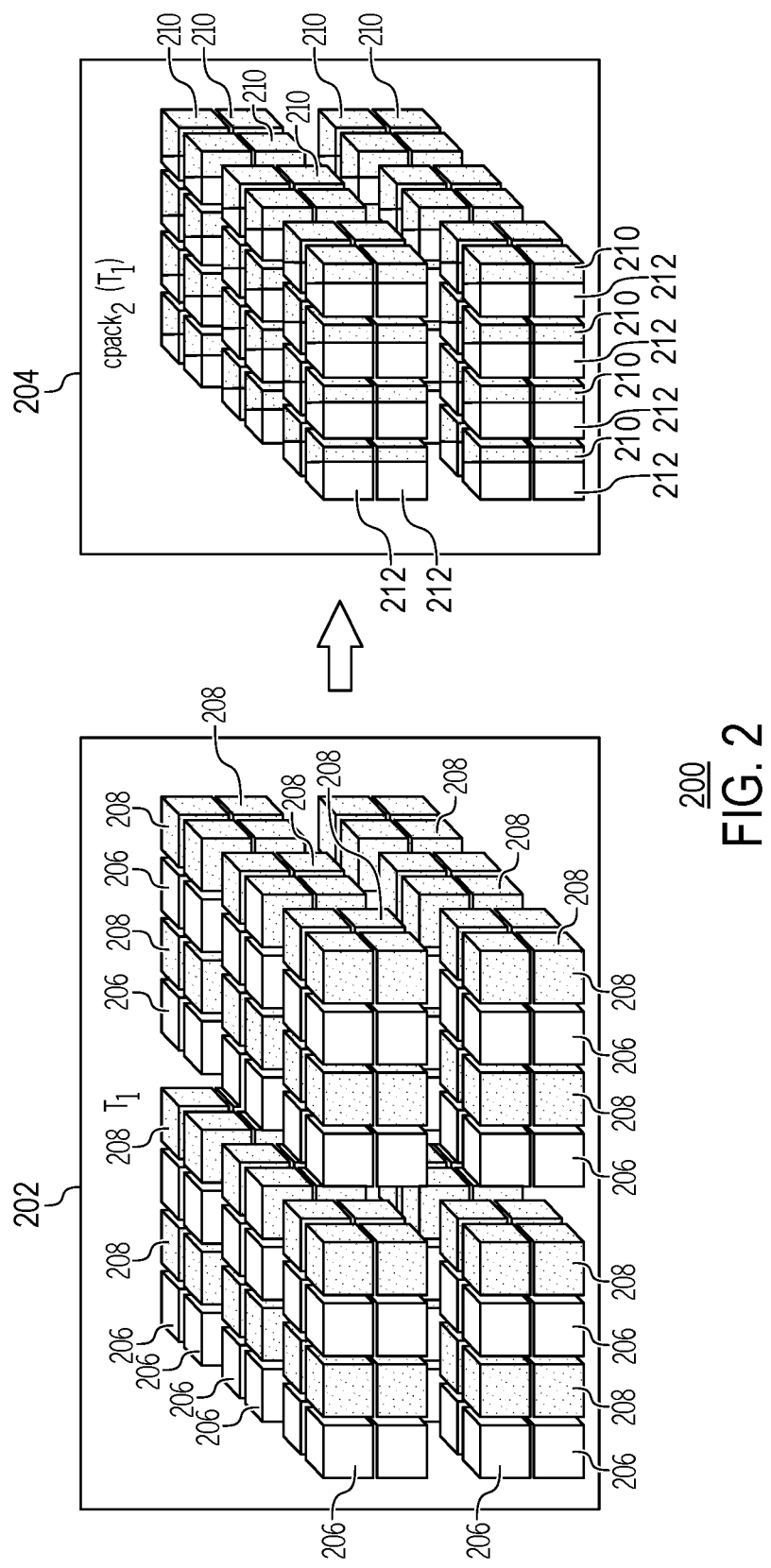
FIG. 2 is a block diagram of an example complex packing of a real-valued tile tensor into a half-the-size complex tile tensor using imaginary parts of complex numbers.

FIG. 2 is a block diagram of an example complex packing of a real-valued tile tensor into a half-the-size complex packed tile tensor using imaginary parts of complex numbers. The example complex packing 200 of FIG. 2 includes an initial set of real-valued tile tensors $T_1$ 202 shown being converted into a complex packed set of tile tensors $cpack_2$ $(T_1)$ 204. For example, the real-valued tile tensors 202 include items 206 depicted as blocks representing real parts holding the real numbered values. The real-valued tile tensors 202 also include a set of items 208 depicted as block representing empty imaginary parts that do not any values in the case of real numbers. The items 206 and 208 are arranged into tiles, which are represented as groups of 2×4×2 blocks. In the example of the real-valued tile tensors 202, a set of a total of 12 tiles is shown. The complex packed tile tensors 204 include real numbers packed using six tiles including items represented by blocks including segments representing imaginary parts 210 of complex numbers in addition to segments representing real parts 212 of complex numbers.

In the example of FIG. 2, the complex packing 200 can pack a real-valued tile tensor T1 represented by 12 tiles into a half-the-size complex packed tile tensor represented by only six tiles across the jth dimension using $CT=cpack_j(T_1)$. In some examples, an inverse operation $T_1 = cUnpack(CT)$ can then be used to unpack the complex packed tile tensor of 12 tiles. For example, the inverse operation may be used to separate the real and imaginary parts, and return the original tile tensor T1.

As shown in FIG. 2, the sets of real numbered items 206 and empty imaginary items 208 are converted into a reduced set of complex tile tensors with items that each contain a real part 212 and imaginary part 210, in which both imaginary parts 210 and real parts 212 are used to encode real numbers. In various examples, the complex packed tile tensors 204 may be used to execute SIMD operations, which may include operations based on or approximated by dot product calculations. For example, such operations may be performed under fully homomorphic encryption and thus be secure.

It is to be understood that the block diagram of FIG. 2 is not intended to indicate that the complex packing 200 is to include all of the components shown in FIG. 2. Rather, the complex packing 200 can include fewer or additional components not illustrated in FIG. 2 (e.g., additional tiles, tile shapes, tile sizes, or additional packings, etc.).

Figure 3:
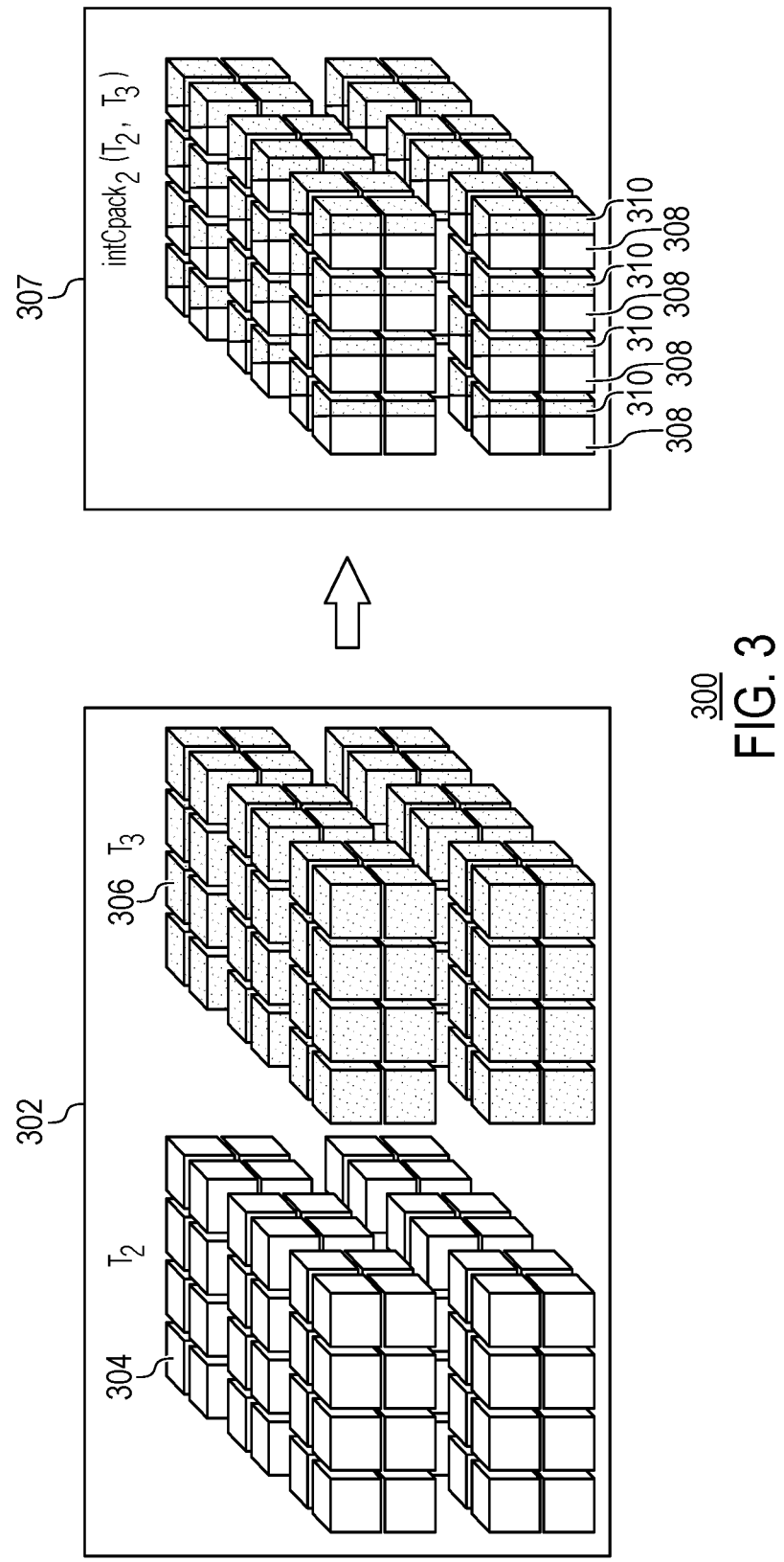
FIG. 3 is a block diagram of an example complex packing of two real-valued tile tensors into a single complex tile tensor using imaginary parts of complex numbers.

FIG. 3 is a block diagram of an example complex packing of two real-valued tile tensors into a single complex tile tensor using imaginary parts of complex numbers. The example complex packing 300 of FIG. 3 shows an unpacked set 302 of tile tensors including a first tile tensor 304 and a second tile tensor 306 being packed into a complex packed tile tensor 307. For example, each of the tile tensors 304 and 306 may include real numbers encoded using only real parts of complex numbers. The complex packed tile tensor 307 includes real numbers encoded using both real parts 308 and imaginary parts 310 of complex numbers.

In the example of FIG. 3, the complex packing 300 can pack two tile tensors $T_2$, $T_3$ of the same shape into a third tile tensor CT of the same shape across the jth dimension using a function intCpackj($T_2$, $T_3$)=$T_2$+i*$T_3$=cpack$_j$($T_4$), where $T_4$ is the result of concatenating $T_2$ and $T_3$ along dimension j, and permuting the elements along this dimension in an interleaved way. In various examples, the inverse operator for complex packing 300 is intCUnpack($CT_1$).

It is to be understood that the block diagram of FIG. 3 is not intended to indicate that the complex packing 300 is to include all of the components shown in FIG. 3. Rather, the complex packing 300 can include fewer or additional components not illustrated in FIG. 3 (e.g., additional tiles, tile shapes, tile sizes, or additional packings, etc.).

Figure 4:
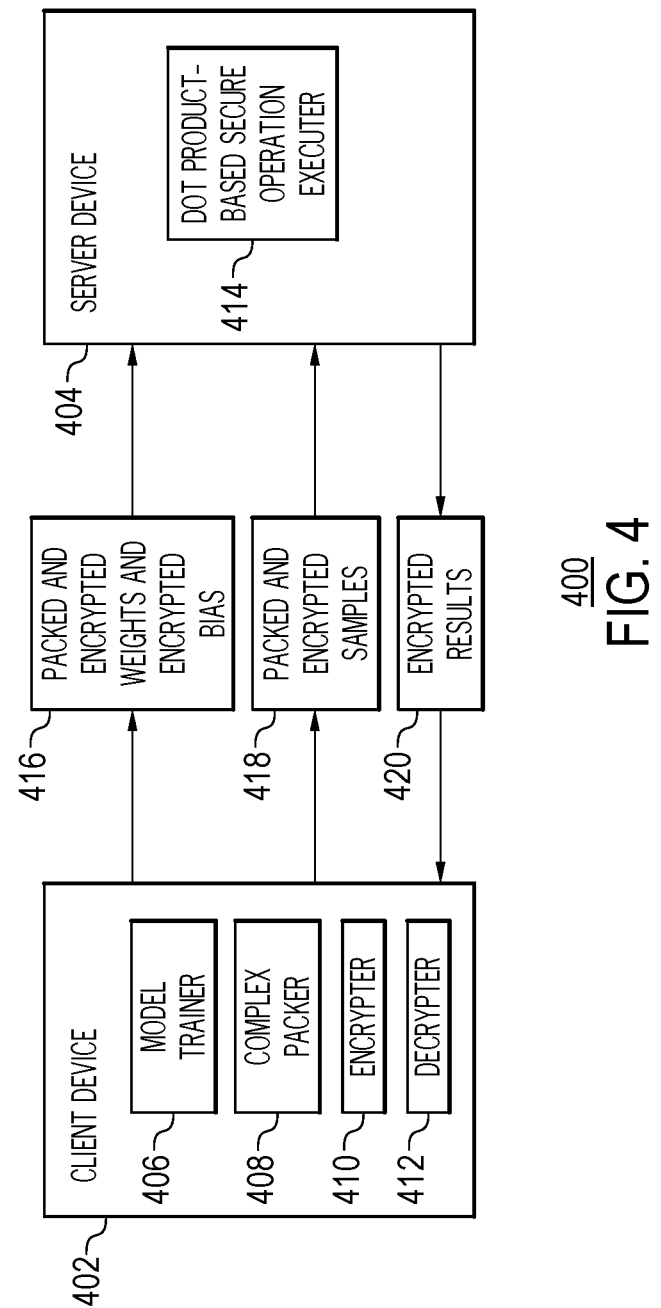
FIG. 4 is a block diagram of an example system for processing encrypted samples using encrypted bias and complex packed and encrypted weights.

FIG. 4 is a block diagram of an example system for processing encrypted samples using encrypted bias and complex packed and encrypted weights. The example system 400 includes a client device 402 communicatively coupled to a server device 404. The client device 402 includes a model trainer 406, a complex packer 408, an encrypter 410, and a decrypter 412. The server device 404 includes a dot product-based secure operation executer 414.

In the example system 400 of FIG. 4, the client device 402 sends packed and encrypted weights and encrypted bias 416 to the service device 404 along with packed and encrypted samples 418 and receives encrypted results 420 from the server device 404. For example, the packed and encrypted samples 418 may be data samples from one or more databases. In some examples, the encrypted results 420 may indicate a subset of intersection in the samples 418. For example, the subset in the encrypted results 420 may be also ordered as originally received from the client device 402. The client device 402 may then decrypt the encrypted results 420 to obtain a list of ordered samples indicating an intersection between one or more datasets.

In some examples, the model trainer 406 of the client device 402 can train a machine learning model to generate a set of weights and biases. For example, the machine learning model may be a linear regression model. In some examples, the training may result in the client device 402 obtaining a weights vector w and a bias vector b. In various examples, the complex packer 408 can then pack the weights using any of the complex packing methods described herein. For example, the weights may be packed using imaginary parts of complex numbers to reduce the number of packings. In some examples, the encrypter 410 can encrypt the set of complex packed weights and the biases. For example, the complex packed weights and biases may be encrypted using FHE or any other suitable encryption. As one example, the client device 402 can pack weights vector w into complex numbers w', reducing its size by half, and encrypts the complex packed vector w' and bias b to obtain encrypted packed weights E(w') and encrypted bias E(b). The packed and encrypted weights and encrypted biases 416 may then be sent to the server device 404.

In various examples, the complex packer 408 client device 402 can then also complex pack samples of data from one or more databases. In some examples, the samples may be data entries from two databases to be compared for intersection. The encrypter 410 can then encrypt the complex packed samples and send the packed and encrypted samples 418 to the server device 404. For example, for each input sample that needs to be classified x, the client device 102 can pack the sample into complex numbers x', encrypt the complex numbers x' to obtain encrypted packed sample E(x') and sends the encrypted packed sample to the server device 404 for classification.

In various examples, the dot product-based secure operation executer 414 of the server device 404 can then compute an encrypted result E(<x,w>) according to techniques described herein, and then adds b and returns the encrypted result E(r)=E(<x,w>+b) to the client device 402. The decrypter 412 of the client device 402 can then decrypt E(r) to obtain <x,w>+b. Thus, the system 400 may enable reduced computation time and reduced communication overhead by using encrypted complex packed samples that are processed efficiently and converted into encrypted results that are unencrypted by the client device 402. As one example, the unencrypted results may be a classification of one or more samples.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional devices, weights, biases, results, or additional layers, etc.).

Figure 5:
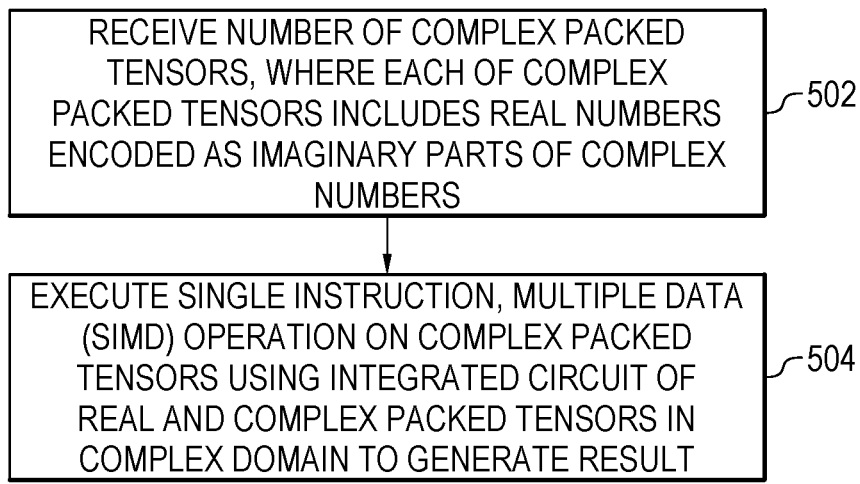
FIG. 5 is a process flow diagram of an example method that can execute SIMD operations over complex planes using homomorphic complex packings.
Figure 9:
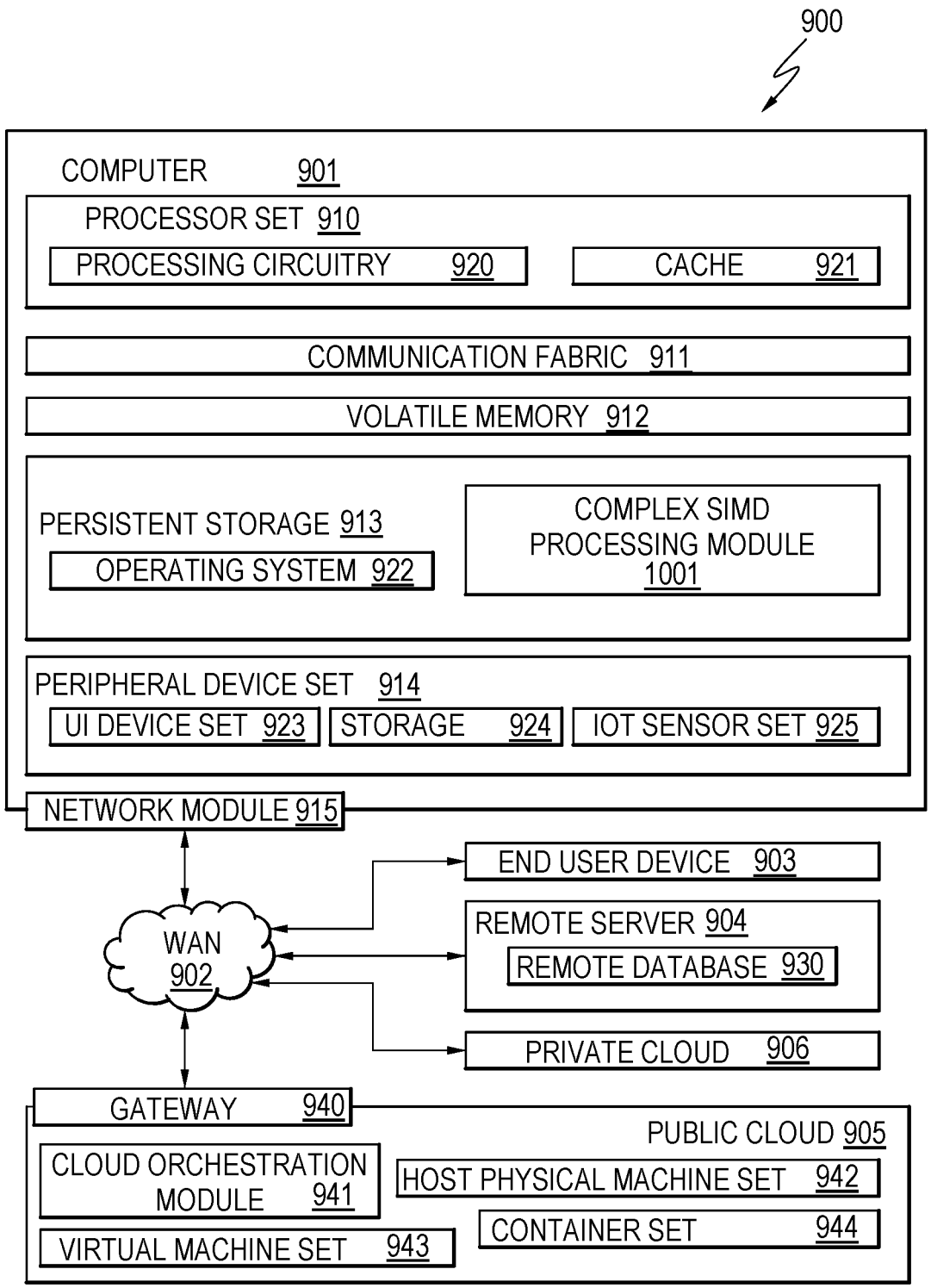
FIG. 9 is a block diagram of an example of an environment for the execution of at least some of the computer code involved in performing the inventive methods, such as complex SIMD processing code.

FIG. 5 is a process flow diagram of an example method that can execute SIMD operations over complex planes using homomorphic complex packings. The method 500 can be implemented with any suitable computing device, such as the computer 901 of FIG. 9, and the system 100 of FIG. 1. In various examples, the methods described below can be implemented by the processor set 910 or processor 1002 of FIGS. 9 and 10. In some examples, the method 500 may be executed by the server device 404 of FIG. 4.

At block 502, a processor receives a number of complex packed tensors, where each of the complex packed tensors include real numbers encoded as imaginary parts of complex numbers. In some examples, the processor may have generated the complex packed tensors from a number of encrypted complex packed tensors using an intermediate complex packing operation on pairs of ciphertexts. For example, the processor can execute the intermediate complex packing operation using Eq. 22. In some examples, the processor may have received a non-complex-packed tensor and transform the non-complex packed tensor into a complex-packed tensor of the number of complex packed tensors using a complex packing method. For example, the non-complex-packed tensor may be a real vector. In some examples, in response to detecting an odd number of ciphertexts, the processor may leave a last ciphertext non-complex-packed. In various examples, the complex packed tensors may be complex packed tile tensors. In some examples, the complex packed tensors may correspond to ciphertexts. In some examples, the complex packed tensors may correspond to single instruction, multiple data (SIMD)-based registers of a hardware processing unit. In some examples, the complex packed tensors correspond to a single data set packed using imaginary parts of complex numbers to represent half of the single data set. In some examples, the complex packed tensors correspond to two data sets with similar dimensions, and the first data set is represented by real parts of complex numbers and the second data set is represented by imaginary parts of the complex numbers.

At block 504, the processor executes a single instruction, multiple data (SIMD) operation on the complex packed tensors using an integrated circuit of real and complex packed tensors in a complex domain to generate a result. For example, the SIMD operation may be a fully homomorphic SIMD operation that is executed securely using a fully homomorphic encryption scheme and the generated result may be an encrypted result. In various examples, the processor may perform a dot product operation on the number of encrypted complex packed tensors. For example, the dot product operation may be performed using the method 800 of FIG. 8. In some examples, the processor may perform a matrix-vector multiplication using an operation between a ciphertext corresponding to a vector and each set of values of an encrypted matrix corresponding to an underlying plaintext matrix, where each row of the encrypted matrix is complex packed in an additional ciphertext. For example, the processor can execute the matrix-vector multiplication using the multiplication and summation operation of Eqs. 7-11. In some examples, the processor can perform an operation on a set of complex packed tile tensors. For example, the processor may add complex packed dimensions to a tile tensor shape information, and additional operators a set of operators supported by a tile tensor. In some examples, the processor can perform a diagonalization operation including a sum operation implemented on a complex packed vector with a non-complex-packed matrix using a rotate-one operator. For example, the processor can implement the rotate-one operator using Eqs. 16-21. In various examples, the SIMD operation approximates a function of a layer of a neural network. For example, the layer of the neural network includes a convolutional layer. In some examples, the layer of the neural network includes a fully-connected layer.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
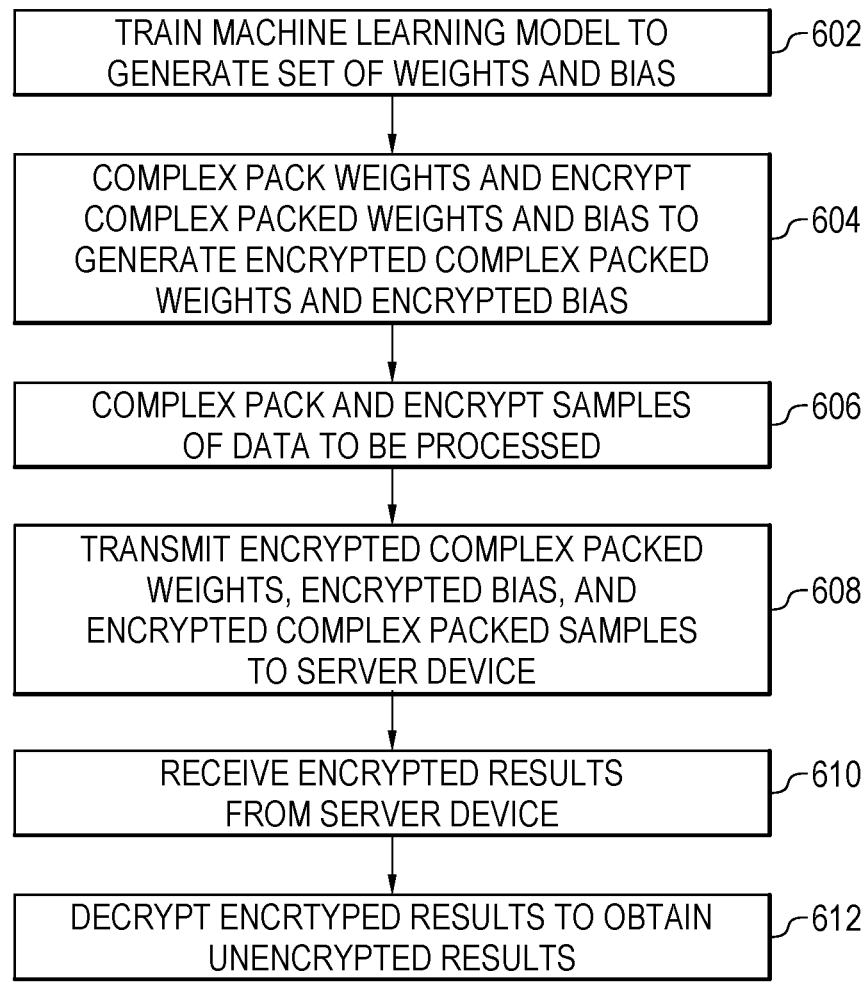
FIG. 6 is a process flow diagram of an example method that can generate encrypted complex packings to be processed using a dot-product based operation.

FIG. 6 is a process flow diagram of an example method that can generate encrypted complex packings to be processed using a dot-product based operation. The method 600 can be implemented with any suitable computing device, such as the computer 901 of FIG. 9 and is described with reference to the system 400 of FIG. 4. In various examples, the methods described below can be implemented by the processor set 910 or processor 1002 of FIGS. 9 and 10. For example, the method 600 may be performed by the client device 402 of the system 400 of FIG. 4.

At block 602, a processor trains a machine learning model to generate a set of weights and bias. For example, the machine learning model may be a linear regression model, a logistic regression model, or any other suitable machine learning model.

At block 604, the processor complex packs the weights and encrypts the complex packed weights and the bias to generate encrypted complex packed weights and encrypted bias. For example, the processor may complex pack the weights using the interleaved complex packing described above. In various examples, the complex packed weights and bias may be encrypted using any suitable encryption algorithm, such as a fully homomorphic encryption algorithm.

At block 606, the processor complex packs and encrypts samples of data to be processed. For example, the processing may be a classification of the samples. In various example, the samples of data may be complex packed and encrypted similarly to the weights.

At block 608, the processor transmits the encrypted complex packed weights, the encrypted bias, and the encrypted complex packed samples to a server device. For example, the processor may transmit the encrypted complex packed weights, the encrypted bias, and the encrypted complex packed samples over any suitable network.

At block 610, the processor receives encrypted results from the server device. For example, the encrypted results may be encrypted classifications.

At block 612, the processor decrypts the encrypted results to obtain unencrypted results. For example, the unencrypted results may be a classification of any number of the samples.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
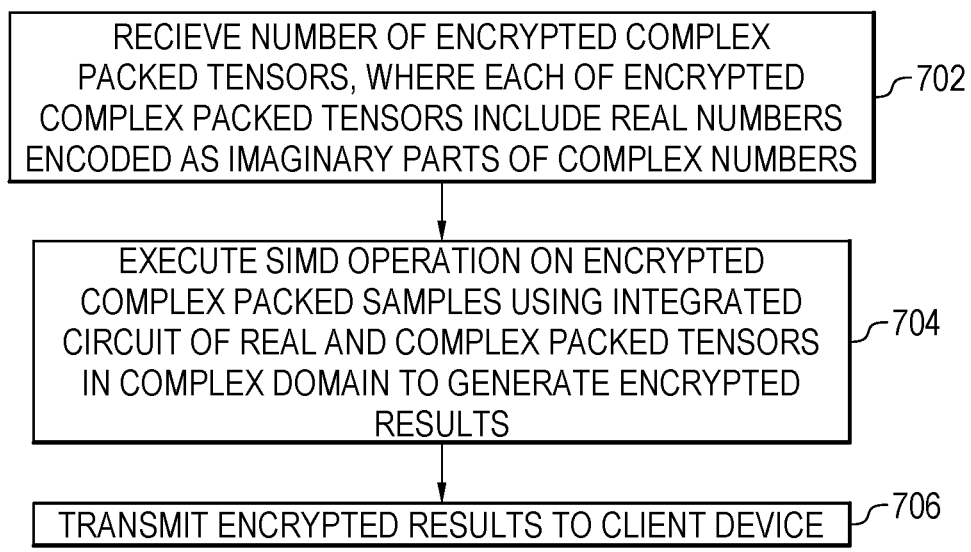
FIG. 7 is a process flow diagram of an example method that can homomorphically manipulate complex packings using a SIMD operation.

FIG. 7 is a process flow diagram of an example method that can homomorphically manipulate complex packings using a SIMD operation. The method 700 can be implemented with any suitable computing device, such as the computer 901 of FIG. 9 and is described with reference to the system 400 of FIG. 4. For example, the methods described below can be implemented by the processor set 910 or processor 1002 of FIGS. 9 and 10. In some examples, the method 600 may be performed by the server device 404 of the system 400 of FIG. 4.

At block 702, a processor receives a number of encrypted complex packed tensors, where each of the encrypted complex packed tensors includes real numbers encoded as imaginary parts of complex numbers. For example, the encrypted complex packed tensors may include encrypted complex packed weights and encrypted complex packed samples of data to be classified.

At block 704, the processor executes a single instruction, multiple data (SIMD) operation on the complex packed tensors using an integrated circuit of real and complex packed tensors in a complex domain to generate an encrypted result. For example, the encrypted result may be an encrypted classification of one or more samples of data corresponding to the encrypted complex packed samples.

At block 706, the processor transmits the encrypted results to a client device. For example, the encrypted results may be decrypted by the client device to obtain decrypted results, such as a classification of one or samples of data.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
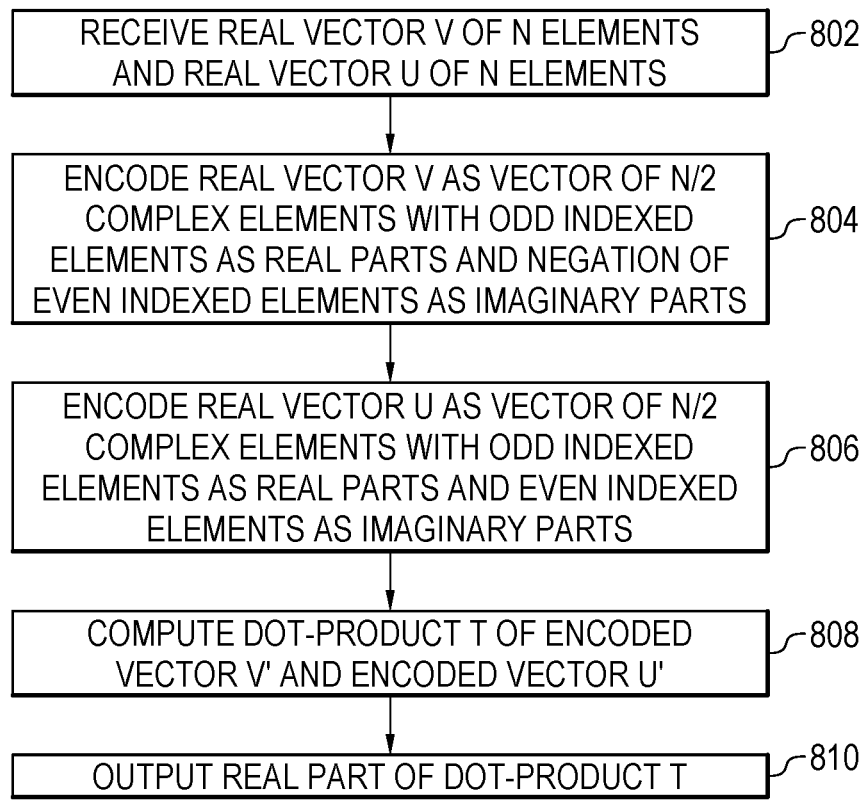
FIG. 8 is a process flow diagram of an example method that can pack real numbers of ciphertexts using imaginary parts of complex numbers.

FIG. 8 is a process flow diagram of an example method that can pack real numbers of ciphertexts using imaginary parts of complex numbers. The method 800 can be implemented with any suitable computing device, such as the computer 901 of FIG. 9 and is described with reference to the system 400 of FIG. 4. For example, the methods described below can be implemented by the processor set 910 or processor 1002 of FIGS. 9 and 10. As another example, the method 800 may be implemented by the client device 402 of FIG. 4.

At block 802, a processor receives a real vector V of n elements and a real vector U of n elements. For example, the real vector V and the real vector U may be samples from a dataset. In various examples, the real vector V and the real vector U may be samples from a database. In some examples, the real vector V and the real vector U may be a user provided image for a machine learning classification task, etc. In various examples, real vector V and the real vector U may be intermediate dot-product computations.

At block 804, the processor encodes the real vector V as a vector of n/2 complex elements with odd indexed elements as real parts and a negation of even indexed elements as imaginary parts. For example, the real vector V may be encoded as: $V'=(v_1-iv_2, \ldots, v_{n-1}-iv_n) \in \mathbb{C}^{n/2}$.

At block 806, the processor encodes the real vector U as a vector of n/2 complex elements with odd indexed elements as real parts and even indexed elements as imaginary parts. For example, the real vector U may be encoded as: $U'=(u_1+iu_2, \ldots, u_{n-1}+iu_n) \in \mathbb{C}^{n/2}$.

At block 808, the processor computes a dot product $\langle V', U' \rangle$ of the encoded vector V' and the encoded vector U'. For example, each of the elements of encoded vector V' may be multiplied by a corresponding element in encoded vector U' and the products summed together. In various examples, the resulting dot product t may be a complex number. Then the dot product $\langle V, U \rangle$ may be calculated using the equation:

$$\langle V, U \rangle = \frac{T + \bar{T}}{2} \qquad \text{Eq. 35}$$

where $$T = \langle V', U' \rangle = (v_1 - iv_2)(u_1 + iu_2) + \ldots + (v_{n-1} - v_n i)(u_{n-1} + u_n i) = \qquad \text{Eq. 36}$$

$$v_1 u_1 + v_2 u_2 - i(v_2 u_1 - v_1 u_2) \ldots v_{n-1} u_{n-1} + v_n u_n - i(v_n u_{n-1} - v_{n-1} u_n)$$

At block 810, the processor outputs a real part of the dot product t. For example, the complex part of the dot product t may be disregarded.

The process flow diagram of FIG. 8 is not intended to indicate that the operations of the method 800 are to be executed in any particular order, or that all of the operations of the method 800 are to be included in every case. Additionally, the method 800 can include any suitable number of additional operations.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as complex SIMD processing module 1001. In addition to block 1001, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 1001, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip."

In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 1001 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 1001 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

Figure 10:
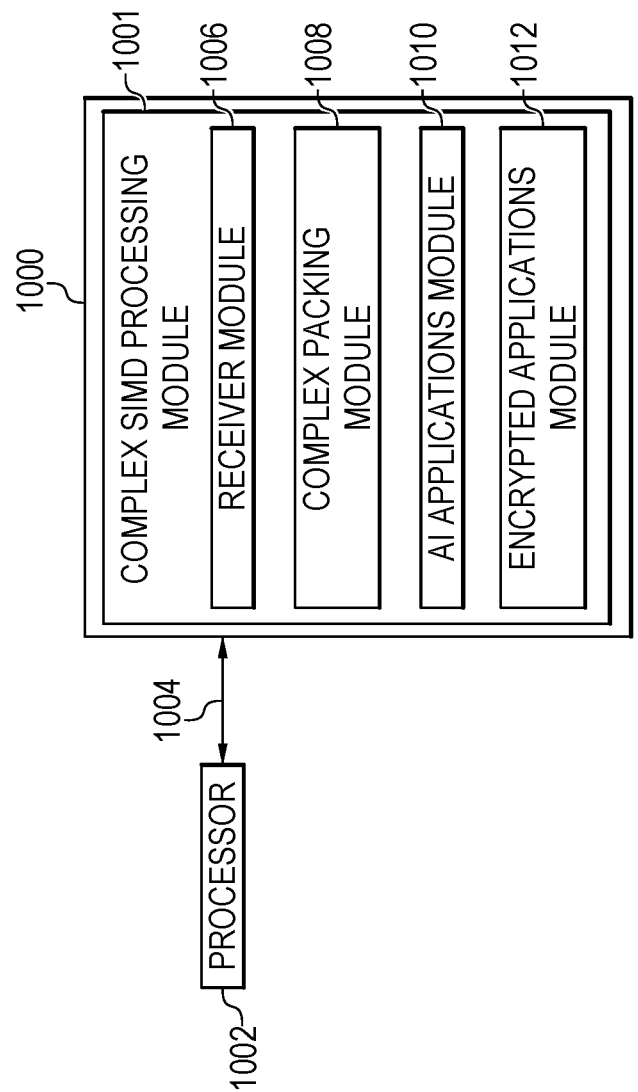
FIG. 10 is an example tangible, non-transitory computer-readable medium that can pack real numbers of ciphertexts using imaginary parts of complex numbers.

Referring now to FIG. 10, a block diagram is depicted of an example tangible, non-transitory computer-readable medium 1000 that can pack real numbers of ciphertexts using imaginary parts of complex numbers. The tangible, non-transitory, computer-readable medium 1000 may be accessed by a processor 1002 over a computer interconnect 1004. Furthermore, the tangible, non-transitory, computer-readable medium 1000 may include code to direct the processor 1002 to perform the operations of the methods 500-800 of FIG. 5-8.

The various software components discussed herein may be stored on the tangible, non-transitory, computer-readable medium 1000, as indicated in FIG. 10. For example, the tangible, non-transitory, computer-readable medium 1000 may include a complex SIMD processing module 1001 that includes a receiver module 1006, a complex packing module 1008, an artificial intelligence (AI) applications module 1010, and an encrypted applications module 1012. In various examples, the receiver module 1006 includes code to receive a number of complex packed tensors. In some examples, the complex packed tensors may be encrypted, using any suitable algorithm such as FHE. In various examples, each of the complex packed tensors include real numbers encoded as imaginary parts of complex numbers. The complex packing module 1008 includes code to generate the complex packed tensors. For example, the complex packing module 1008 can generate the complex packed tensors using an interleaving complex packing operation on pairs of ciphertexts. In some examples, in response to detecting an odd number of ciphertexts, the complex packing module 1008 may leave a last ciphertext non-complex-packed. In some examples, the complex packing module 1008 further includes code to adding complex packed dimensions to a tile tensor shape information, and additional operators a set of operators supported by a tile tensor. The AI applications module 1010 includes code to execute a single instruction, multiple data (SIMD) operation on the encrypted complex packed tensors using an integrated circuit of real and complex packed tensors in a complex domain to generate a result. In some examples, the AI applications module 1010 includes code to perform a dot product operation on the number of complex packed tensors. For example, the AI applications module 1010 may include code to perform a matrix-vector multiplication using an operation between a ciphertext corresponding to a vector and each row of an encrypted matrix, wherein each row of the encrypted matrix is complex packed in an additional ciphertext. In various examples, the result is encrypted and the AI applications module 1010 includes code to send the result to a client device to be decrypted. The encrypted applications module 1012 includes code to execute secure operations on the complex packed tensors. For example, the encrypted applications module 1012 includes code to execute various operations in a secure manner. For example, the operations may include a dot product, matrix multiplication, among other the operations as described herein. In some examples, the encrypted applications module 1012 includes code to execute various operations homomorphically on encrypted complex packed tensors to generate encrypted results.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 10 may be included within the tangible, non-transitory, computer-readable medium 1000, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a processor set;
one or more computer-readable storage media; and
program instructions stored on the one or more computer-readable storage media to cause the processor set to perform operations comprising:
receiving a plurality of non-complex packed tensors and complex packed tensors, wherein each of the complex packed tensors comprises real numbers encoded as imaginary parts of complex numbers;
transforming a non-complex packed tensor into a complex-packed tensor of the plurality of complex packed tensors; and
executing a homomorphically encrypted single instruction, multiple data (SIMD) operation on the complex packed tensors using an integrated circuit of real and complex packed tensors corresponding to SIMD-based registers in a complex domain to generate a result.

2. The system of claim 1, wherein the complex packed tensors comprise complex packed tile tensors.

3. The system of claim 1, wherein the homomorphically encrypted SIMD operation is executed securely using a fully homomorphic encryption scheme and the result comprises an encrypted result.

4. The system of claim 1, wherein the complex packed tensors correspond to ciphertexts.

5. The system of claim 1, wherein the complex packed tensors correspond to the SIMD-based registers of a hardware processing unit.

6. The system of claim 1, wherein the plurality of complex packed tensors correspond to a single data set packed using imaginary parts of complex numbers to represent half of the single data set.

7. The system of claim 1, wherein the plurality of complex packed tensors correspond to two data sets with similar dimensions, and a first data set is represented by real parts of complex numbers and a second data set is represented by imaginary parts of the complex numbers.

8. The system of claim 1, wherein the SIMD operation approximates a function of a layer of a neural network.

9. The system of claim 8, wherein the layer of the neural network comprises a convolutional layer.

10. The system of claim 8, wherein the layer of the neural network comprises a fully-connected layer.

11. The system of claim 1, wherein the non-complex packed tensor is transformed using a complex packing method.

12. A computer-implemented method, comprising:
receiving, via a processor, a plurality of non-complex packed tensors and complex packed tensors, wherein each of the complex packed tensors comprise real numbers encoded as imaginary parts of complex numbers;
transforming a non-complex packed tensor into a complex-packed tensor of the plurality of complex packed tensors; and
executing, via the processor, a homomorphically encrypted single instruction, multiple data (SIMD) operation on the complex packed tensors using an integrated circuit of real and complex packed tensors corresponding to SIMD-based registers in a complex domain to generate a result.

13. The computer-implemented method of claim 12, wherein executing the SIMD operation comprises performing a dot product operation on the plurality of complex packed tensors.

14. The computer-implemented method of claim 12, wherein executing the SIMD operation comprises performing a matrix-vector multiplication using an operation between a ciphertext corresponding to a vector and a set of values of an encrypted matrix corresponding to an underlying plaintext matrix, wherein each row of the encrypted matrix is complex packed in an additional ciphertext.

15. The computer-implemented method of claim 12, comprising adding complex packed dimensions to a tile tensor shape information, and additional operators a set of operators supported by a tile tensor, wherein executing the SIMD operation comprises performing an operation on a set of complex packed tile tensors.

16. The computer-implemented method of claim 12, comprising generating the plurality of complex packed tensors using an interleaving complex packing operation on pairs of ciphertexts, and in response to detecting an odd number of ciphertexts, leaving a last ciphertext non-complex-packed.

17. The computer-implemented method of claim 12, wherein executing the SIMD operation comprises performing a dot product operation, wherein the plurality of complex packed tensors comprise a first vector encoded with odd indexed elements as real parts and a negation of event indexed elements as imaginary parts and a second vector encoded with odd indexed elements as real parts and even indexed elements as imaginary parts, wherein performing the dot product operation comprises computing a dot product of the first vector and the second vector and outputting a real part of the dot product.

18. The computer-implemented method of claim 12, wherein executing the SIMD operation comprises performing a diagonalization operation comprising a sum operation implemented on a complex packed vector with a non-complex-packed matrix using a rotate-one operator.

19. A computer program product for packing real numbers, the computer program product comprising a computer-readable storage medium having program code embodied therewith, the program code executable by a processor to cause the processor to:
- receive a plurality of non-complex packed tensors and complex packed tensors, wherein each of the complex packed tensors comprise real numbers encoded as imaginary parts of complex numbers;
- transform a non-complex packed tensor into a complex-packed tensor of the plurality of complex packed tensors; and
- execute a homomorphically encrypted single instruction, multiple data (SIMD) operation on encrypted complex packed tensors using an integrated circuit of real and complex packed tensors corresponding to SIMD-based registers in a complex domain to generate a result.

20. The computer program product of claim 19, wherein the complex packed tensors and the generated result are encrypted, further comprising program code executable by the processor to send the result to a client device to be decrypted.

* * * * *